United States Patent
Karlsson et al.

(10) Patent No.: US 11,272,519 B2
(45) Date of Patent: Mar. 8, 2022

(54) DYNAMIC TRAFFIC SHAPING FOR COMMUNICATION NETWORKS IN MOVING VEHICLES, SUCH AS TRAINS

(71) Applicant: ICOMERA AB, Gothenburg (SE)

(72) Inventors: Mats Karlsson, Gothenburg (SE); Peter Eklund, Gothenburg (SE)

(73) Assignee: ICOMERA AB, Gothenburg (SE)

( * ) Notice: Subject to any disclaimer, the term of this patent is extended or adjusted under 35 U.S.C. 154(b) by 0 days.

(21) Appl. No.: 15/362,024

(22) Filed: Nov. 28, 2016

(65) Prior Publication Data

US 2017/0164379 A1 Jun. 8, 2017

(30) Foreign Application Priority Data

Dec. 4, 2015 (SE) .................................. 1551596-8

(51) Int. Cl.
*H04W 72/10* (2009.01)
*H04W 4/70* (2018.01)
(Continued)

(52) U.S. Cl.
CPC ............ *H04W 72/10* (2013.01); *H01Q 1/243* (2013.01); *H04B 1/3822* (2013.01); *H04L 47/20* (2013.01);
(Continued)

(58) Field of Classification Search
None
See application file for complete search history.

(56) References Cited

U.S. PATENT DOCUMENTS 7,061,860 B1  6/2006  Calvignac et al.
8,612,612 B1 * 12/2013  Dukes .................... H04L 67/14
                                                             370/230
(Continued)

FOREIGN PATENT DOCUMENTS

EP   1 175 757 A1   1/2002
EP   1 912 385 A1   4/2008
(Continued)

OTHER PUBLICATIONS

Swedish Office Action dated Jul. 12, 2016, issued in corresponding Swedish Patent Application No. 1551596-8. (7 pages).
(Continued)

*Primary Examiner* — Mariela Vidal Carpio
(74) *Attorney, Agent, or Firm* — Buchanan Ingersoll & Rooney P.C.

(57) ABSTRACT

A method and system for wireless communication between a moving vehicle, such as a train, and a remote server through at least one external mobile network are disclosed. The communication system includes at least one router in the train for receiving and transmitting wireless data communication to and from a stationary communication server outside the train through at least one exterior mobile network via at least one antenna. The router includes a control unit configured to allocate bandwidth according to a predefined packet policy to streams of data packets which are matched to the predefined packet policies, providing for a very efficient bandwidth management in a wireless network within a train. Hereby, is easy to prioritize voice-over-IP (VOIP) and/or VPN traffic over video traffic.

10 Claims, 3 Drawing Sheets

(51) Int. Cl.
  *H04W 72/04* (2009.01)
  *H04L 12/813* (2013.01)
  *H04W 28/02* (2009.01)
  *H04L 12/851* (2013.01)
  *H01Q 1/24* (2006.01)
  *H04B 1/3822* (2015.01)
  *H04M 7/00* (2006.01)
  *H04W 84/00* (2009.01)
  *H04L 47/20* (2022.01)
  *H04L 47/2441* (2022.01)

(52) U.S. Cl.
  CPC ........ *H04L 47/2441* (2013.01); *H04M 7/006* (2013.01); *H04W 4/70* (2018.02); *H04W 28/021* (2013.01); *H04W 72/0446* (2013.01); *H04W 72/0453* (2013.01); *H04W 84/005* (2013.01)

(56) References Cited

U.S. PATENT DOCUMENTS

| | | | |
|---|---|---|---|
| 2004/0111461 A1* | 6/2004 | Claudatos | H04L 41/0893 709/200 |
| 2005/0172008 A1 | 8/2005 | Claudatos et al. | |
| 2009/0282469 A1* | 11/2009 | Lynch | H04W 12/06 726/11 |
| 2012/0213114 A1 | 8/2012 | Chen et al. | |
| 2012/0224484 A1* | 9/2012 | Babiarz | H04L 41/5019 370/235 |
| 2012/0275445 A1* | 11/2012 | Karlsson | H04W 8/183 370/338 |
| 2013/0201316 A1 | 8/2013 | Binder et al. | |
| 2013/0310021 A1* | 11/2013 | Bergek | H04W 84/005 455/422.1 |
| 2014/0003335 A1* | 1/2014 | Roy | H04L 69/14 370/328 |
| 2014/0136589 A1* | 5/2014 | Wahler | H04L 29/08144 709/201 |
| 2014/0143402 A1* | 5/2014 | Liu | H04L 47/803 709/223 |
| 2015/0029987 A1 | 1/2015 | Addepalli et al. | |
| 2015/0103383 A1* | 4/2015 | Dowling | H04N 1/00225 358/402 |
| 2015/0146523 A1* | 5/2015 | Yang | H04L 12/5692 370/230 |
| 2016/0099866 A1* | 4/2016 | Stellick | H04L 45/22 370/225 |

FOREIGN PATENT DOCUMENTS

| | | |
|---|---|---|
| EP | 2 518 977 A1 | 4/2011 |
| WO | WO 00/67435 A1 | 11/2000 |

OTHER PUBLICATIONS

The extended European Search Report dated May 26, 2017, by the European Patent Office in corresponding European Patent Application No. 16198962.9-1857. (8 pages).

* cited by examiner

DYNAMIC TRAFFIC SHAPING FOR COMMUNICATION NETWORKS IN MOVING VEHICLES, SUCH AS TRAINS

TECHNICAL FIELD OF THE INVENTION

The present invention relates to a wireless communication system for moving vehicles, such as trains.

BACKGROUND

The demands on wireless communication capabilities in today's society are increasing rapidly. In particular, fast and easily accessible communication is desired through handheld devices over large areas. It is particularly challenging to achieve such communication for mobile devices which are moving, e.g. when moving over large distances with poor network coverage or when affected by unknown sources of noise interrupting a signal for communication, such as clients moving on e.g. trains, airplanes, and other types of moving vehicles. In particular, if a client, such as a mobile phone, moves over large areas the client has to connect to several base stations in order to maintain a sufficient connection for communication.

Further, e.g. train carriages are made of metal, and even the windows are normally covered with a metal film. Accordingly, train carriages are shielded compartments, and direct communication between terminal antennas within the carriages and externally located antennas is difficult to obtain.

The mobile nature of a client with respect to the base stations may also introduce several potential sources of communication performance degradation. Such sources may derive from complex terrain, competition for available channels, or the source may be an unknown source of noise related to e.g. radio-frequency interference.

At the same time, there is today an increasing demand from passengers to be able to communicate through mobile phones and other handheld terminals when travelling on e.g. trains, and also to be able to get access to the Internet with laptops, PDAs etc. Further, with the new smartphones, and the way these are used, with e.g. continuously operating applications, many phones are active at all times, meaning that many handovers are required when the train moves. Even though this problem is common for all moving vehicles, it is especially pronounced for vehicles moving at high speed, such as trains and airplanes, and trains are in addition facing problems with poor line-of-sight between the base stations and the train. This puts a strain on the wireless network infrastructure, leading to poor performance.

To this end, moving vehicles, such as train carriages, are often provided with an external antenna connected to a repeater unit within the carriage, which in turn is connected to an internal antenna. Hence, the communication between the passengers' terminals and the operator antennas outside the vehicle occurs through the repeater unit. Similarly, it is known to provide a mobile access router for data communication, also connected both to an external antenna and an internal antenna, in each carriage, in order to provide Internet access on board the vehicle. Such mobile access router solutions are e.g. commercially available from the applicant of the present application, Icomera AB, of Gothenburg, Sweden, and are also disclosed in EP 1 175 757 by the same applicant. This method has greatly improved the reliability of high-bandwidth wireless communication for trains and other large vehicles. However, this solution may still be insufficient to obtain an optimal transmission performance, especially for large data volumes. Trains and other moving vehicles often pass through areas with bad radio coverage, and present solutions are often unable to handle the required traffic.

Further, e.g. the current rising trend of streaming media uses far more data per minute of journey per passenger than older uses of the Internet, such as browsing text- and image-based sites like Facebook, or checking and responding to email.

As a remedy to this, a known system for allocating bandwidth in the internal networks within the trains has been to employ a bandwidth cap, also called Fair Access Policy or Fair Usage Policy. Hereby users are allowed to utilize a certain "free" amount of data during a session, e.g. 25 MB, 75 MB, 200 MB etc., depending on the service provider. However, once the "free" amount of data has been used, the session is either terminated or the connection speed is significantly reduced for the end user, alternatively the end user might be allowed more data for an excess charge.

However, this solution is limited in many ways, and does also not completely solve the problems associated with the lack of available bandwidth during the full trip. For example, it is common that during the initial period of the trip, the majority of clients are often connected and all of them are able to use the full amount of "free" data for certain period of time. This puts considerable strain on the communication system during certain time periods, and an inefficient use of the available bandwidth utilization. Even more, there exists a possibility that users may inadvertently consume much bandwidth by running very active applications, thus reducing the performance for other users and making inadvertent use of the "free" data, thereby limiting the possibility to use it for more important purposes later on.

Another known solution for restricting the use is to charge a fee, charged e.g. in relation to the time when the communication system has been used, or the amount of data that has been communicated. Even though this may be efficient to limit the use of the communication system, it provides extra initial hurdles for the users, and also severely reduces the travel experience and user satisfaction.

There is therefore a need for an improved method and system for communicating with clients on moving vehicles, and in particular trains, allowing increased capacity, capacity utilization, quality and/or cost-efficiency. Even though the above discussion is focused on trains, similar situations and problems are encountered in many other types of moving vehicles, and in particular moving passenger vehicles, such as buses, ships and airplanes.

SUMMARY OF THE INVENTION

It is therefore an object of the present invention to provide a method for wireless communication and a wireless communication system for moving vehicles, and in particular a train, which alleviates all or at least some of the above-discussed drawbacks of the presently known systems.

This object is achieved by means of a wireless communication method and system for a moving vehicle, such as a train as defined in the appended claims.

According to a first aspect of the present invention, there is provided a method for wireless communication between a moving vehicle, such as a train, and a remote server through at least one external mobile network, the method comprising:

providing at least one router in the moving vehicle for receiving and transmitting wireless data packets to and from a stationary communication server outside said moving vehicle through said at least one exterior mobile network via at least one antenna and to and from at least one client onboard the moving vehicle;

determining in said router if a stream of wireless data packets matches a predefined packet policy; and allocating in said router, if said stream of wireless data packets matches said predefined packet policy, bandwidth and/or prioritization for the stream of wireless data packets according to the predefined packet policy.

The "router" is a networking router, which is a machine that forwards data packets between computer networks, on at least one data link in each direction. The router may be a mobile access router, and preferably a mobile access and applications router. The router preferably comprises means for determining if a wireless data packet matches a predefined packet policy, the means being for example appropriate hardware and/or software, from here on referred to as a control unit.

The router and the remote server are preferably connected through a plurality of exterior mobile networks, which are simultaneously useable. Also, the router is preferably arranged to communicate with the communication server on at least two different data links (communication routes) having different characteristics, and to automatically separate the communication traffic between said data links based on the evaluation. The data streams are then forwarded on one or several links to and from a dedicated external server, which may be referred to as an aggregation server or gateway. The different links thereby form a single virtual link between the router and the gateway.

The communication can be automatically optimized based on the evaluation, and also optionally on other conditions, such as price, speed, latency, etc. Thus, in addition to the evaluation, prioritizing and assignments may be made based on other static or dynamic parameters, such as signal strength and the like. Such further optimizations are per se known from EP 1 175 757 by the same applicant, said document hereby incorporated by reference. An automatic selection is then made among the available data links to use the most efficient combination. Hence, a seamless distribution of the data among the different data links is obtained.

The router may use any available data links, such as two or more of e.g. GSM, Satellite, DVB-T, HSPA, EDGE, 1×RTT, EVDO, LTE, Wi-Fi (802.11) and WiMAX; and combine them into one virtual network connection. In particular, it is preferred to use data links provided through wireless wide-area network (WWAN) communication technologies.

The selection of links is preferably made once for each data stream. However, re-selection for data streams that have failed may also be made. Further, data streams may also be split among two or more data links, e.g. by transferring a first part of a data stream on one data link to begin with, and then continue the transfer of the rest of the data stream on another data link, based on a re-assignment decision. Re-selection and/or re-assignment may also be made based on other criteria than complete failure of the presently used data link, such as when the evaluated quality of the link presently used is significantly deteriorated, falls below a certain threshold, or the like.

The "predefined packet policy" contains at least predefined bandwidth and/or priority levels to be allocated for one or several specific data packet types or data stream types.

By means of the present invention, either bandwidth allocation or prioritization may be controlled, or a combination of the two. Prioritizing may here comprise assignment of streams to different available links, so that a stream with higher priority is assigned with a link having higher bandwidth, less latency or the like, and a stream with less priority is assigned to links having less bandwidth, higher latency or the like. Prioritizing may be related to the order in which packets on a link are forwarded, so that packets from streams having higher priority are forwarded more quickly than packets from streams having less priority. Prioritizing may also be related to how actively streams are re-allocated to new links when the performance of the current link is deteriorated. For example, highly prioritized streams may be re-allocated as soon as one or more threshold(s) in respect of performance has been passed, whereas less prioritized streams may be re-allocated based on other threshold(s), or not re-allocated at all. In this way, the most prioritized streams may be allocated to the best performing links. It is also possible to use some of the links more sparsely, thereby saving capacity for re-allocation when the need arises. Still further, the prioritization may be different on uplink and downlink, so that streams are higher or lower prioritized on uplink or downlink, depending on the available capacity.

The predefined packet policy may further be associated with a Quality of Service (QoS), i.e. a data packet may be matched with a QoS, wherein networking conditions, such as bandwidth allocation, network access, etc., are set according to the QoS. The predefined policy may additionally further specify priority, minimum bandwidth allocation or maximum bandwidth allocation.

Moreover, in one exemplary embodiment the predefined packet policy may depend on elapsed time, time of day, day of week, number of clients connected to the networking router, available total bandwidth, etc. or a combination thereof. Thus, the networking conditions set for a specific wireless data packet may differ depending on time of day, day of week, etc.

By having a dynamic predefined packet policy the wireless communication service provider may customize the networking conditions so to provide best possible utilization of the full bandwidth, i.e. some train journeys and the like might be less crowded than others, and thus the predefined packet policy may be set in less restrictive manner than for fully booked trains, planes and the like.

The dynamic adjustment may be utilized to adjust the bandwidth and/or priority allocated for one or several of the data packet types included in the policy, for adjustment of the bandwidth and/or priority allocated to data packet types not included in the policy, or allocated as default in the policy, adjustment of all allocation levels, etc.

The determining of a possible match between the wireless data packets and the predefined packet policy is in one exemplary embodiment based on packet size and pattern of a packet stream, defined by the wireless data packets. Additionally the match may depend on a source and a destination of the wireless data packets. The packet size and pattern of packets being used to determine the type of packet stream, as defined by the data packets, and matching the type to a specified type in the predefined packet policy. For example, it is possible to determining if the packet stream is related to web browsing, e-mailing, computer gaming, media-streaming, such as video, voice over IP (VoIP), VPN communication, etc. and ultimately allocating bandwidth according to the determined type of packet stream.

For example, a stream of small packets every 15-25 milliseconds in both directions can with high probability be recognized as a VoIP call.

Thus, the step of determining if a stream of wireless data packet matches a predefined packet policy preferably comprises determining at least one of a source, a destination, a size and pattern of the wireless data packets, and using this for identification of a data packet or data stream type. Additionally or alternatively, the step of determining if a stream of wireless data packet matches a predefined packet policy preferably comprises identification of a data packet or data stream type for said data packet based on deep packet inspection. In particular, it is of interest to identify if the data packet is a video data packet, and to define in the predefined packet policy at least one rule restricting allocated bandwidth and/or priority for video data packets. Since video, e.g. in streaming services, is normally responsible for a very large part of the data traffic, limiting allocated bandwidth or priority for this packet type is normally very efficient to provide bandwidth availability for other packet types. It may, additionally or alternatively, be of great interest to identify data types which are most in need for good quality and high bandwidth, and provide more bandwidth and/or priority to such packet types. Such packet types to be prioritized are e.g. voice-over-IP (VOIP) data packets and a VPN data packets, and the predefined packet policy preferably comprises at least one rule increasing allocated bandwidth for VOIP and/or VPN data packets.

Thus, the present invention may e.g. be used for allocating more bandwidth for certain applications such as VoIP and less bandwidth for watching streaming video, computer gaming or P2P-downloading. Further, the matching between the wireless data packet and the predefined packet policy may be based on source and destination of the packets, ports used, protocol, IP-addresses, etc. The matching may also accordingly be performed via a deep packet inspection (DPI), which is per se known in the art, wherein specific applications associated with the data packets are identified/classified.

The network traffic management concept as such, i.e. managing bandwidth according to conditions imposed on the packet streams, is per se known, and often referred to as traffic shaping or packet shaping. Such techniques can be found in e.g. US2005/0172008, EP1912385, U.S. Pat. No. 7,061,860, US2004/0111461, Adaptiband™ by XRoads Networks, Radware's Deep Flow Inspection™ and NAVL by Procera Networks, all of which are hereby incorporated by reference. Despite the fact that traffic shaping has been known for more than a decade, as far as is presently known, it has never been used in moving vehicles, such as trains. It has now been realized by the present inventor not only that a similar traffic shaping technology can also be used in moving vehicles, and in particular trains, but also that this provides new and unexpected advantages and possibilities for modification.

Wireless communication networks are nowadays by necessity provided on trains and other passenger carrying vehicles. As stated in the background section, the demand from passengers to be able to communicate via handheld devices or laptops when travelling is ever-increasing. The present invention is based on the realization that current bandwidth management techniques employed on wireless networks within e.g. trains were based on old requirements, and originated from a time before smart phones, tablets and extremely portable laptops (aka ultrabooks). Unlike those times, today almost every passenger has the ability to connect to the onboard wireless network. The increased demand for bandwidth has been addressed with efforts to increase the overall available bandwidth, or by introduction of general restrictions, such as a specified maximum data limit for each user, by charging by the hour or by amount of data. However, none of these solutions are satisfactory in the long run. The present invention mitigates the problem associated with unfair bandwidth usage, aka "hogging", i.e. when one or a small number of users "hog" all the bandwidth. Another benefit of the inventive system or method is that the full bandwidth of the total available bandwidth may be utilized in an optimal way. Moreover, the present invention allows for a more versatile, dependable and fair usage of the onboard network by promoting certain activities or applications and throttling others. For example it might be more beneficial to satisfy business travelers, who may work during the trip, and ensure a certain QoS associated with applications normally used by business travelers, by restricting bandwidth allocation and/or prioritization and throttling the connection speed for users attempting to stream High Definition videos etc, which may be of less priority. Thus, static bandwidth caps or limits may be removed in favor of the more dynamic method as defined by the present invention improving overall system adaptability and in the end providing a better Quality of Experience (QoE).

In one exemplary embodiment, the method further comprises a step of, if the wireless data packet does not match a predefined packet policy, allocating bandwidth and/or prioritization for the wireless data packet according to a default packet policy. The default packet policy may also be dependent on dynamic conditions, such as time of day, day of week, number of clients connected, available total bandwidth, etc. The default packet policy can be to block or drop the wireless data packets.

In one exemplary embodiment the predefined packet policy is client dependent. Providing a client dependent packet policy enables for additional customization for bandwidth allocation and/or prioritization. For example, passengers sitting in a premium class cabin may be allocated more bandwidth and/or higher priority than passengers sitting in an economy class cabin. The detection of which cabin the passenger is seated in can be provided in several ways, for example, cabin specific access points, different network user-ids for different cabins, etc.

According to another aspect of the present invention, there is provided a wireless communication system for a moving vehicle, such as a train, comprising:
- at least one router in the moving vehicle, said router being configured for receiving and transmitting wireless data communication to and from a stationary communication server outside said moving vehicle through at least one exterior mobile network via at least one antenna, and for receiving and transmitting data to and from at least one client onboard the moving vehicle, said router including at least one control unit configured to:
  - determine if a stream of wireless data packets matches a predefined packet policy, and
  - allocating, if said stream of wireless data packets matches the predefined packet policy, bandwidth and/or priority for the stream of wireless data packets according to the predefined packet policy.

With this aspect of the invention, similar advantages and preferred features are present as in the previously discussed first aspect of the invention.

These and other features and advantages of the present invention will in the following be further clarified with reference to the embodiments described hereinafter.

BRIEF DESCRIPTION OF THE DRAWINGS

For exemplifying purposes, the invention will be described in closer detail in the following with reference to embodiments thereof illustrated in the attached drawings, wherein.

DETAILED DESCRIPTION OF PREFERRED EMBODIMENTS

In the following detailed description, preferred embodiments of the present invention will be described. However, it is to be understood that features of the different embodiments are exchangeable between the embodiments and may be combined in different ways, unless anything else is specifically indicated. Even though in the following description, numerous specific details are set forth to provide a more thorough understanding of the present invention, it will be apparent to one skilled in the art that the present invention may be practiced without these specific details. In other instances, well known constructions or functions are not described in detail, so as not to obscure the present invention. In the detailed embodiments described in the following are related to trains. However, it is to be acknowledged by the skilled reader that the method and system are correspondingly useable on other moving vehicles, such as buses, ferried, airplanes and the like.

Figure 1:
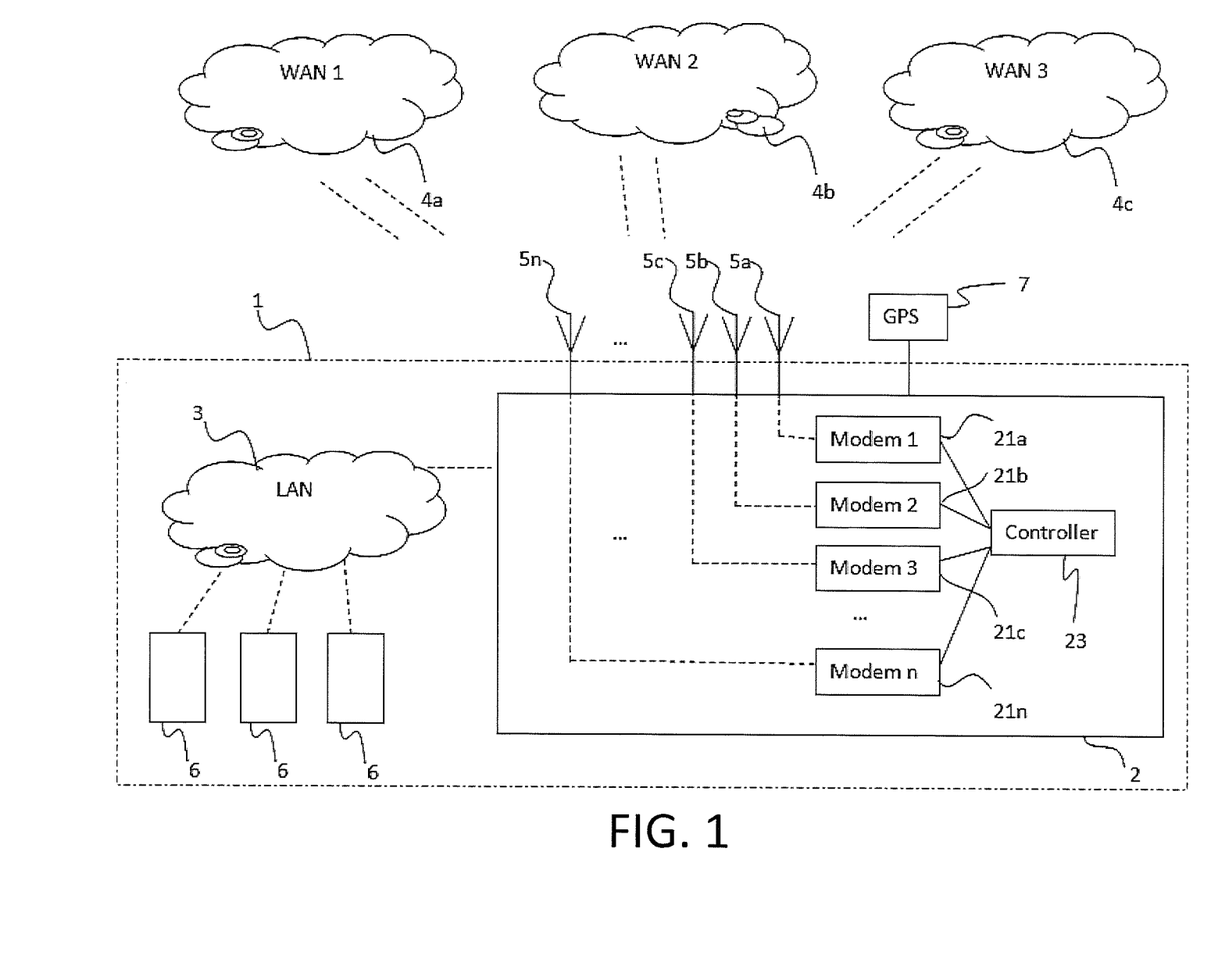
FIG. 1 is a schematic illustration of a train having a wireless communication system in accordance with an embodiment of the present invention.

In FIG. 1 a schematic illustration of a vehicle 1, such as a train, having a communication system is provided. The communication system comprises a data communication router 2 for receiving and transmitting data between an internal local area network (LAN) 3, and one or several external wide area networks (WANs) 4a, 4b, 4c. Communication to and from the WANs is provided through one or several antennas 5 a-n arranged on the train, the antennas may be arranged on the roof of the train, on window panes of the train, etc. Two or more data links are available, either between the train and one of the WANs, and/or by using several WANs simultaneously.

The LAN is preferably a wireless network, using one or several internal antennas to communicate with terminal units 6 within the vehicle. It is also possible to use a wired network within the vehicle. The LAN may be set-up as wireless access point(s). The client(s) 6 may be computing devices such as laptops, mobiles telephones, PDAs, tablets and so on.

The data communication router comprises a plurality of modems 21 a-n. Assignment of data streams to different WANs and/or to different data links on one WAN is controlled by a controller 23. The controller is preferably realized as a software controlled processor. However, the controller may alternatively be realized wholly or partly in hardware.

The controller is furthermore preferably arranged or configured to determine if wireless data packets match a predefined packet policy. The predefined packet policy is configurable by a user or administrator of the network. Moreover, the control unit is preferably configured to allocate bandwidth and/or prioritization for wireless data packets according to the predefined packet policy that was matched to the wireless data packets. For example, data packets from an e-mailing application may be matched to a part of the predefined packet policy that contains instructions to allocate a certain percentage of the bandwidth for that application.

The system may also comprise a global positioning system (GPS) receiver 7 for receiving GPS signals indicative of the current position of the vehicle, and wherein the controller may be arranged to adjust bandwidth allocations for certain or all packet types also partly in dependence on said received GPS signals.

The data communication router may also be denominated MAR (Mobile Access Router) or MAAR (Mobile Access and Applications Router).

The traffic shaping may be realized in various ways. For example, it may involve Deep Packet Inspection (DPI), Deep Flow Inspection (DFI), route-based traffic shaping, etc.

Figure 2:
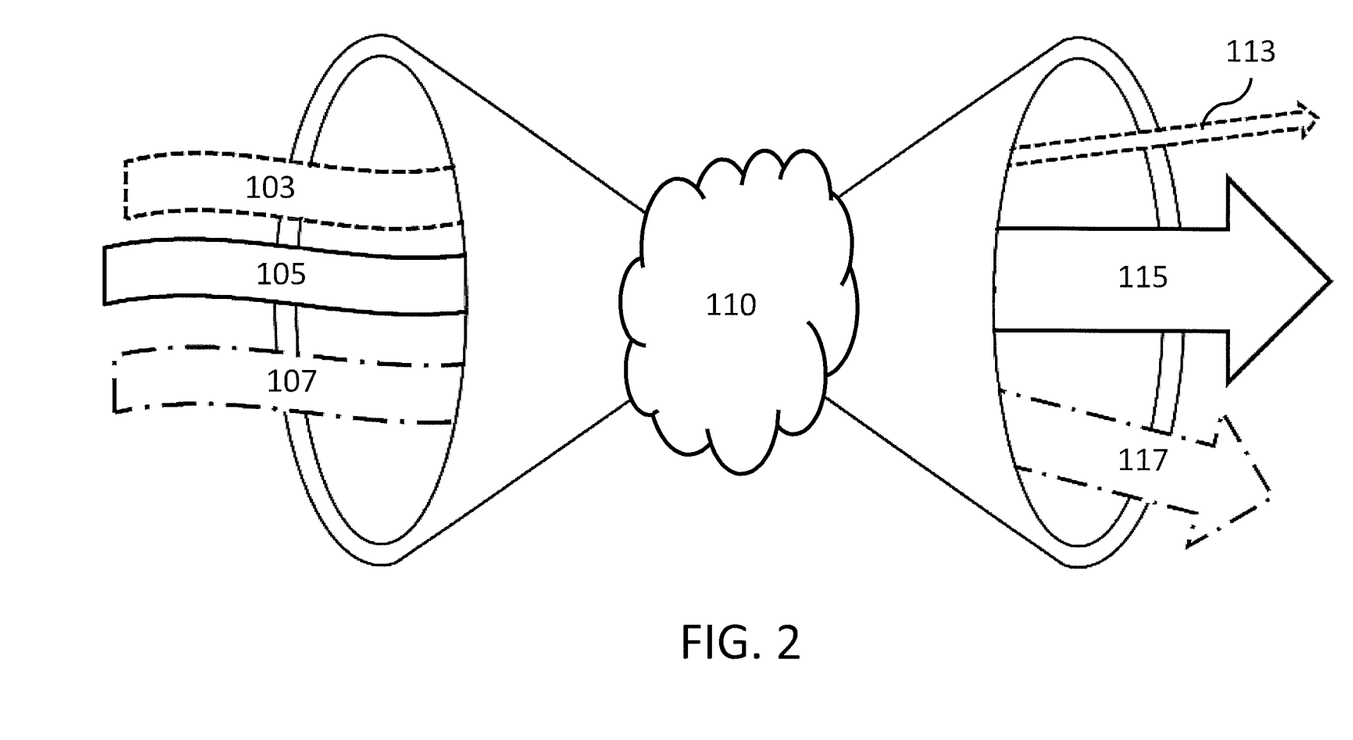
FIG. 2 is a schematic illustration of a traffic shaping process in accordance with an embodiment of the present invention.

FIG. 2 illustrates a simplified schematic traffic shaping process, so to provide a basic conceptual understanding. In the exemplary embodiment illustrated in FIG. 2, there are three flows/streams of data packets 103, 105, 107 entering a network edge device 110, i.e. a router (e.g. router 2 in FIG. 1), a routing switch, an integrated access device (IAD), a WAN access device, etc. In this particular exemplary embodiment, data stream 103 is a High Definition video stream, data stream 105 is a business application stream, such as VPN communication, and 107 is a VoIP stream. Upon reaching the network edge device 110, an internal control unit (such as e.g. 23 in FIG. 1), determines if there are predefined packet policies which may be matched or assigned to each of the data streams, defined by data packets. Once a match has been made, the control unit is further configured to allocate bandwidth and/or priority for each application, respectively, according to instructions in the predefined packet policy. As illustrated by arrows 113, 115, 117 the incoming data packets/data streams, 103, 105, 107 have been allocated different bandwidths. The data stream representing an HD-video stream has a significantly reduced bandwidth, in favor of the business application, which enjoys the most bandwidth. The VoIP outgoing data stream 117 has been allocated a bandwidth percentage there between the other two. Preferably applications like VoIP, requiring a certain bandwidth and/or priority to ensure a minimum quality is allocated with at least that minimum bandwidth, but if more bandwidth is available more bandwidth is allocated for the VoIP. By configuring the predefined packet streams, and associating them with a Quality of Service (QoS) measure, the traffic shaping can be very dynamic.

Furthermore, the predefined packet policy may be configured so to depend on time of day, day of the week, number of clients connected, total available bandwidth, etc. Therefore, the bandwidth allocation and/or prioritization for specific software applications may be very dynamic.

The present invention allows for defining a priority for software applications within the wireless communication network in a train. By throttling certain bandwidth-heavy applications such as high definition media streaming, which may not be of high priority, less bandwidth demanding applications are promoted. Thus, more passengers/clients may utilize the network, provided within the train, much more efficiently. Additionally, by only analyzing packet sizes and packet patterns of packet streams received by the router, the data stream type can be determined even for encrypted data, thus, passengers connected via a Virtual Private Network (VPN) tunnel will not impose a problem for the analysis. Moreover, the privacy of the passengers remains uncompromised. Thus, contrary to conventional deep packet inspection, it is here only a need to determine a packet type or type of data stream, whereas the actual content is of no interest. This makes it possible to make the determination easier, faster and more cost-efficient.

Figure 3:
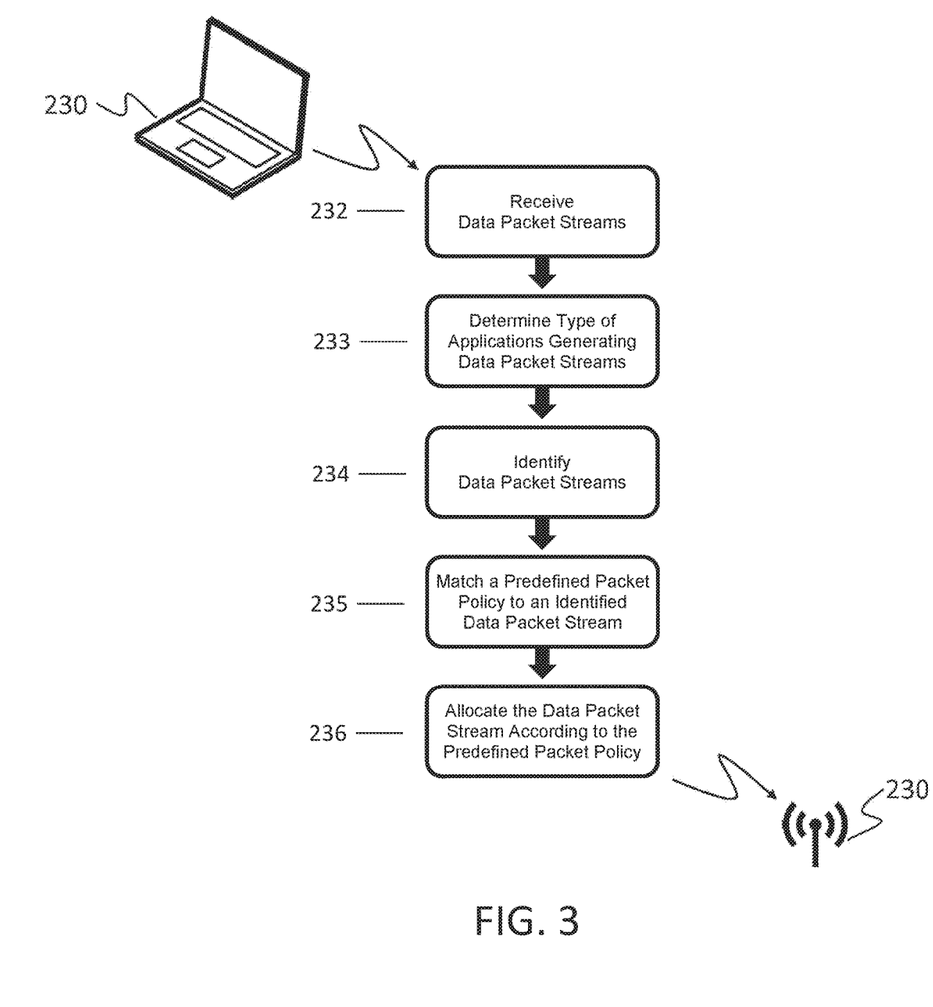
FIG. 3 is a schematic flow chart illustrating a traffic shaping sequence in accordance with an embodiment of the present invention.

In FIG. 3 a schematic flow chart of the traffic shaping sequence according to an exemplary embodiment of the invention is illustrated. Data packets are sent from the client/passenger device 230, in this embodiment a laptop 230, and received 232 at router 2, or any other suitable network edge device. In the next process step 233, the type of application generating the packets is determined. The determining process 233 starts with an analysis of the data packets. Preferably, the analysis is done by checking the size and pattern of the packet stream as defined by the received packets. The analysis can also be performed by additionally or separately checking source and destination of the packets. However, the analysis of the data packets may be performed in various ways, as earlier stated, according to specific requirements or needs.

In the next process step 234, the data packets are identified, i.e. the type is determined. For instance it may be determined in process step 234 what type of data stream has been received by the router, e.g. video stream, VoIP, email, music stream, etc. Once the data packets have been identified, the matching process 235 is initiated; a predefined packet policy is matched 235 to the identified data packet stream. If the data packet stream could not be identified for various reasons, the unidentified data packets are matched to a default predefined packet policy. The predefined packet policy preferably contains instructions of how much bandwidth to allocate for the matched data packets. In the next process step 236, bandwidth and/or priority for the identified packet stream is allocated according to the predefined packet policy, before sending the data packets to at least one antenna 230, arranged on the train, where the antenna(s) is (are) communicating with at least one WAN. The default packet policy preferably also depends on dynamic conditions, such as time of day, day of week, number of clients connected, available total bandwidth, etc.

As an example, characteristics of some identifiable data stream types are summarized in the following table, together with possible bandwidth (BW) and priority allocation that may be used for these data stream types.

TABLE

Example of data stream type characteristics and prioritization

| Data stream type | Acceptable latency | Quantity of data | BW at high capacity | BW at low capacity | BW at very low capacity | Priority |
|---|---|---|---|---|---|---|
| Voice (VoIP) | A few ms | Low | High | High | High | High |
| Video | >10 s | High | Medium | Low | None | Low |
| http and https | >5 s | Low-high | High | Medium | None | Medium |
| Payment | ~2-5 s | Low | High | High | High | High |

Voice data streams, such as VoIP calls, are very sensitive to latency. A latency of only a few milliseconds will be experienced as very annoying for users. At the same time, the data streams are typically very long in time, but the data quantity is relatively low. Thus, voice may be highly prioritized, and allocated high bandwidth capacity, or as high as possible, at all times, regardless of whether the total available capacity is high, low or even extremely low.

In the same way data streams related to payment services may be highly prioritized, and allocated high bandwidth. Payment data streams are typically having low quantities of data. Payment services, such as paying for services, ordering tickets, etc, are often aborted relatively quickly. Thus, the latency should not be more than 2-5 seconds, depending on the service providers.

Video data streams are often large, having high quantities of data. On the other hand, since the receiver normally buffers data, quite long latency times are acceptable. Also, providers of video data streams normally adjust the resolution and quality of the video data stream in accordance with the transmission capacity. Thus, if high bandwidth is available, data streams of high definition may be sent, whereas if moderate or low bandwidth is available, data streams of lower definition will be used. Video data streams will typically have low priority, and the bandwidth should preferably be restricted or even highly restricted when the bandwidth capacity is low. Further, the bandwidth capacity may be restricted also at times when the bandwidth capacity is high, since this will make the data stream provider transmitting the data stream with lower definition. This is beneficial when the available bandwidth varies greatly over time, which is typically the case at e.g. trains, but also lowers the overall data quantities sent to and from the train, thereby lowering the strains on the communication system and saves costs.

Other type of http and https data, such as reading newspapers on-line, sending e-mails, etc, are also relatively insensitive to latency, and the data streams are often relatively short and with relatively low quantities of data. For example a newspaper is typically forwarded as a plurality of separate data streams. Preferably, such data streams are allocated a medium priority, and allocated with high bandwidth when available, but restricted or much restricted bandwidth when the capacity is low.

The present invention has here been disclosed in relation to trains, where it is considered to be particularly advantageous. However, it may also be implemented and used on other moving vehicles, and in particular vehicles intended for passenger traffic, such as buses, ferries, airplanes, etc.

The invention has now been described with reference to specific embodiments. However, several variations of the communication system are feasible. For example, the policy may be used to restrict bandwidth for certain type(s) of data, to increase bandwidth for certain type(s) of data, or a combination of these. Further, data types may be identified in many different ways, as already exemplified. Such and other obvious modifications must be considered to be within the scope of the present invention, as it is defined by the appended claims. It should be noted that the above-mentioned embodiments illustrate rather than limit the invention, and that those skilled in the art will be able to design many alternative embodiments without departing from the scope of the appended claims. In the claims, any reference signs placed between parentheses shall not be construed as limiting to the claim. The word "comprising" does not exclude the presence of other elements or steps than those listed in the claim. The word "a" or "an" preceding an element does not exclude the presence of a plurality of such elements.

The invention claimed is:

1. A method for wireless communication between a moving vehicle and a remote server outside said moving vehicle through at least one external mobile network, the method comprising:
   providing at least one router in the moving vehicle for receiving and transmitting wireless data packets to and from the remote server through said at least one exterior mobile network via at least one antenna and to and from at least one client onboard the moving vehicle;

determining in said at least one router when a stream of wireless data packets matches a predefined packet policy; and allocating in said at least one router, when said stream of wireless data packets matches said predefined packet policy, bandwidth and priority for the stream of wireless data packets according to the predefined packet policy, wherein the step of determining when a stream of wireless data packets match a predefined packet policy includes: determining when the stream of wireless data packets are video data packets, and wherein the predefined packet policy includes at least one rule restricting allocated bandwidth and priority for video data packets; and determining when the data packets are at least one of a voice-over-IP (VOIP) data packets and virtual private network (VPN) data packets, and wherein the predefined packet policy includes at least one rule increasing allocated bandwidth and priority for VOIP and VPN data packets;

wherein restricting priority comprises re-allocation of streams to new links less actively when a performance of a current link is deteriorated, wherein streams with higher priority are re-allocated as soon as one or more first threshold(s) in respect of performance has been passed, and faster than less prioritized streams are re-allocated, the less prioritized streams being re-allocated based on other, one or more second threshold(s).

2. The method of claim 1, further comprising:
allocating in said at least one router, when said stream of wireless data packets does not match a predefined packet policy, at least one of bandwidth and priority for the stream of wireless data packets according to a default packet policy.

3. The method of claim 1, wherein said predefined packet policy is a dynamic policy depending on available total bandwidth at a given time instance.

4. The method of claim 1, wherein the step of determining when a stream of wireless data packets match a predefined packet policy comprises determining at least one of a source, a destination, a size and pattern of the wireless data packets, and using the determination for identification of a data packet or data stream type.

5. The method of claim 1, wherein the step of determining when a stream of wireless data packets match a predefined packet policy comprises identification of a data packet or data stream type for said data packets based on deep packet inspection.

6. The method of claim 1, wherein the predefined packet policy is client dependent.

7. The method of claim 1, wherein the at least one router is configured for receiving and transmitting wireless data to and from an aggregation server, using aggregated communication over at least two separate links.

8. The method of claim 1, wherein the at least one router is configured to estimate at least one of a quality of one or more link(s) to communicate with the at least one exterior mobile network and available total bandwidth to the at least one exterior mobile network, and dynamically adjust at least one of bandwidth and priority allocation to the clients based on the estimation.

9. The method of claim 1, wherein the step of determining when a stream of wireless data packets matches a predefined packet policy is based on an analysis of size and pattern of packets of the stream of wireless data packets.

10. A wireless communication system for a moving vehicle, comprising:
at least one router in the moving vehicle, said at least one router being configured for receiving and transmitting wireless data communication to and from a stationary communication server outside said moving vehicle through at least one exterior mobile network via at least one antenna, and for receiving and transmitting data to and from at least one client onboard the moving vehicle, said at least one router including at least one control unit configured to:
determine when a stream of wireless data packets matches a predefined packet policy, and
allocating, when said stream of wireless data packets matches the predefined packet policy, bandwidth and priority for the stream of wireless data packets according to the predefined packet policy,
wherein the determining when a stream of wireless data packets match a predefined packet policy includes: determining when the stream of wireless data packets is a stream of video data packets, and wherein the predefined packet policy includes at least one rule restricting allocated bandwidth and priority for video data packets; and determining when the data packets are at least one of a voice-over-IP (VOIP) data packets and virtual private network (VPN) data packets, and wherein the predefined packet policy includes at least one rule increasing allocated bandwidth and priority for VOIP and VPN data packets;
wherein restricting priority comprises re-allocation of streams to new links less actively when a performance of a current link is deteriorated, wherein streams with higher priority are re-allocated as soon as one or more first threshold(s) in respect of performance has been passed, and faster than less prioritized streams are re-allocated, the less prioritized streams being re-allocated based on other, one or more second threshold(s).

* * * * *